United States Patent [19]
Huber

[11] Patent Number: 6,032,515
[45] Date of Patent: Mar. 7, 2000

[54] TEST SYSTEM FOR FLUID TIGHT INTEGRITY OF INSTALLED PIPELINE

[76] Inventor: Donald G. Huber, P.O. Box 64160, Tacoma, Wash. 98464

[21] Appl. No.: 09/350,786

[22] Filed: Jul. 9, 1999

Related U.S. Application Data

[60] Provisional application No. 60/093,682, Jul. 22, 1998.
[51] Int. Cl.[7] .............. G01M 3/04; F16K 7/00; F16L 55/10
[52] U.S. Cl. .............. 73/49.1; 73/49.8; 73/49.5; 73/40.5 R; 138/90
[58] Field of Search ............... 73/46, 49.1, 49.5, 73/49.8, 40.5 R; 138/89, 90, 92, 94

[56] References Cited

U.S. PATENT DOCUMENTS

| | | |
|---|---|---|
| 1,720,819 | 7/1929 | Cohen . |
| 1,948,220 | 2/1934 | Kennedy . |
| 3,091,259 | 5/1963 | Alessio . |
| 3,327,379 | 6/1967 | Clements . |
| 3,467,271 | 9/1969 | Kaiser et al. . |
| 3,712,115 | 1/1973 | Miller . |
| 4,132,111 | 1/1979 | Hasha . |
| 4,194,721 | 3/1980 | Nachtigahl . |
| 4,376,597 | 3/1983 | Britton et al. . |
| 4,429,568 | 2/1984 | Sullivan ................................. 73/49.8 |
| 4,542,642 | 9/1985 | Tagliarino . |
| 4,602,504 | 7/1986 | Barber . |
| 4,607,664 | 8/1986 | Carney et al. . |
| 4,624,131 | 11/1986 | Holm et al. . |
| 4,658,861 | 4/1987 | Roberson, Sr. . |
| 4,706,482 | 11/1987 | Barber . |
| 4,763,510 | 8/1988 | Palmer . |
| 4,821,559 | 4/1989 | Purpora . |
| 4,848,155 | 7/1989 | Huber . |
| 4,936,350 | 6/1990 | Huber ........................................ 138/90 |
| 5,033,510 | 7/1991 | Huber ........................................ 138/90 |
| 5,076,095 | 12/1991 | Erhardt . |
| 5,163,480 | 11/1992 | Huber ........................................ 138/94 |
| 5,740,830 | 4/1998 | Mankins . |

*Primary Examiner*—Daniel S. Larkin
*Attorney, Agent, or Firm*—Garrison & Associates PS; Matthew J. Marquardt; David L. Garrison

[57] ABSTRACT

An improved system for the non-destructive testing of the fluid tight integrity of an installed fluid transfer line such as a drain pipe or vent and wastewater system of a building. A removable test baffle is installed in a seat extending radially into the sidewall of a pipe or other fluid transfer line to isolate an installed portion of the fluid line for testing. The test baffle comprises a pair of gaskets to improve the effectiveness of the baffle in sealing or isolating the line and a domed central web to facilitate testing at increased pressures. The test baffle optionally further includes a lightweight, low cost ribbed construction and a means for removing the baffle from either the convex or concave side of the dome without leaving behind any portion of the baffle to impair fluid flow within the line. On removal, the baffle is flexed into a saddle shape and removed from the line without need for dismantlement of the line.

20 Claims, 4 Drawing Sheets

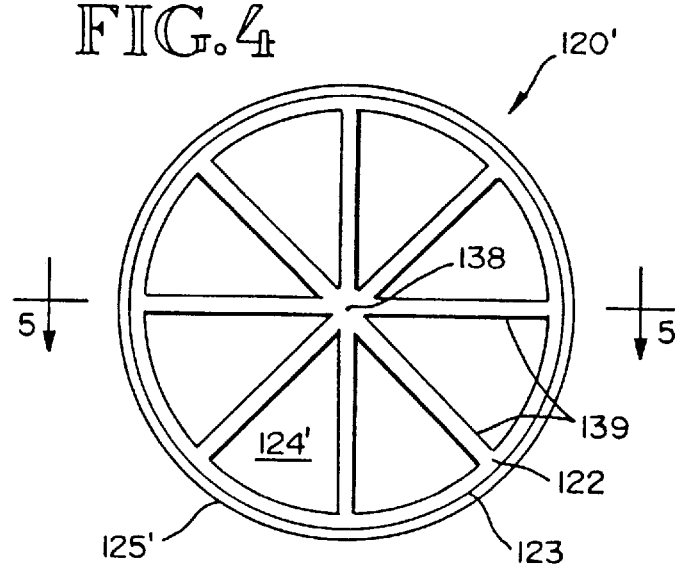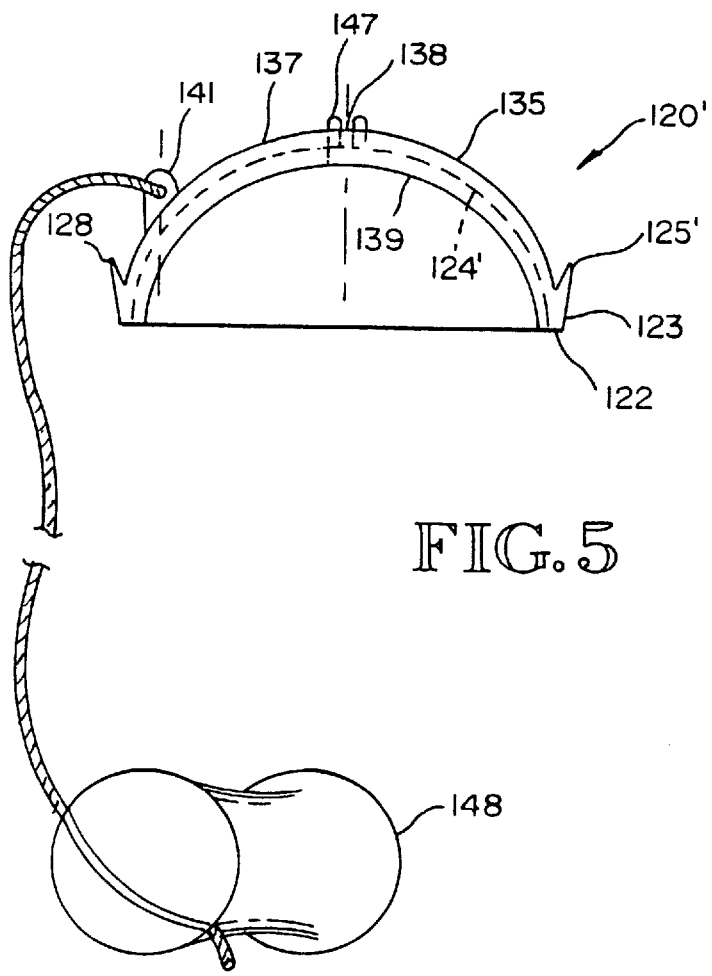

TEST SYSTEM FOR FLUID TIGHT INTEGRITY OF INSTALLED PIPELINE

This application claims the benefit of united States provisional patent application Ser. No. 60/093,682, entitled Test System for Fluid Tight Integrity of Installed Pipeline and filed Jul. 22, 1998.

TECHNICAL FIELD

The invention relates to the testing of pipes and other fluid transfer lines; more particularly, it relates to method and apparatus for non-destructive pressure testing of installed pipelines.

BACKGROUND OF THE INVENTION

In the construction of mechanical systems, a newly installed or repaired fluid transfer system or system component, as for example a building plumbing or sewage system, or a drain system between floors of a multi-floor building, must frequently be isolated from the a larger system sewage service line until the plumbing construction is tested and inspected, by subjecting the system to a fluid pressure test to locate any leaks, and often certified for compliance with building code requirements. For example, it is common practice within the construction industry to place an outlet end of a newly installed sewage conduit of the building at a juncture near an inlet to a sewage service line. During installation, these two lines are capped and not connected. Where these two lines would otherwise meet, each line is capped off until testing and inspection are complete. As a result of usual construction techniques, the juncture is frequently buried before the tests are performed. After the testing and inspection are complete, the connection site is re-excavated, the caps removed, and a secure connection of the two lines is made. The difficulty of making such tests is often aggravated by the fact that some portion of the system is embedded in a wall or other location difficult of access. For example, in a multi-floor building it is often necessary or convenient to test a drain line on a floor-by-floor basis, before finishing walls covering the drain line, as once wall covering the drain line has been installed and allowed to set, it is generally either exceedingly difficult or impossible to access the drain system or a drain access port. Thus, a vexing question has been posed by the need to seal a localized portion of a drain system or other plumbing or fluid installation system to accommodate testing.

Various patents have been issued disclosing test or isolation valve assemblies used in the inspection of drain systems prior to connection of the systems to sewer lines.

Sullivan, U.S. Pat. No. 4,429,568, discloses a closure plug for pressure testing a liquid drain and vent plumbing type system. Sullivan uses a clean-out Y for access to open the plug plate assembly.

Cohen, U.S. Pat. No. 1,720,819, discloses a test tee having a tapered gate which closes off a house drain pipe from a drainage system. After the test has been completed, the gate is removed from the test tee and the resulting opening in the tee is closed by a cover plate.

Tagliarnio, U.S. Pat. No. 4,542,642, discloses a test tee having a plug which is a removable blocking disk. The blocking disk engages a ledge in the test tee and seals the drainage system. The diaphragm is accessible and removable through an access means.

Roberson, U.S. Pat. No. 4,658,861, discloses a pneumatic plug inserted though a clean-out tee to block off a house service line to the main sewer line.

Kennedy, U.S. Pat. No. 1,948,220, discloses a test plumbing system using a flap valve which is pivoted at an upper side of the valve seat. The flap valve is held in position by a valve adjusting rod.

Barber, U.S. Pat. No. 4,602,504, shows a permanently installed test fitting in which a seal diagram has a frangible, removable portion which may be broken away from the diaphragm and removed to permit service use of the system. A portion of the seal diaphragm remains permanently in the conduit with its edge exposed.

These references relate to the general field of disclosure of this invention but many suffer from the permanent presence of apparatus in the conduit which can catch refuse and cause pluggage.

More recently, U.S. Pat. Nos. 4,848,155, 4,936,350, 5,033,510, and 5,163,480 to Huber have disclosed various apparatus for isolating and testing plumbing installations. It has been noted, however, through usage of the devices described therein, that improvements might be made in the effectiveness of the seal in the test baffle and in means and method for removal of the baffle after the test has been completed. It has also proved possible to improve the flexibility of the baffles disclosed therein, without sacrificing the strength or pressure-resistant capabilities of the baffles, in order to facilitate easier and more efficient removal of the baffles from the fluid line following testing.

Other attempts have included glued-in or molded "cookies" to seal flow within a pipe, in the same general manner as the baffles described in the Huber references above, and inflatable balloon inserted into the fluid line and filled with air or water to block flow. "Screw-in" threaded type plugs have been tried as well, as have dual-plate devices comprising a pair of flat plates attached through their centers by a coaxial tightening device. But glued or molded cookies are often inconvenient to use, and after removal leave behind portions of the baffle which thereafter permanently block part or all of the flow within the fluid line; and they also not infrequently get stuck themselves on removal, requiring dismantlement of the fluid line itself or causing permanent flow obstructions. Inflatable balloons rarely seal the fluid line effectively, especially under moderate or high pressures, such that leakage is a common and continual problem, and testing is rarely fully effective—and typically messy or hazardous, as leaked fluid must be cleaned up or (in the case of gasses) is irretrievably introduced to the atmosphere. Threaded plugs rarely allow testing of an installed system in the form in which it will be used, thus providing at best incomplete test results; and dual-plate devices, which generally comprise substantially rigid plates having flexible polymeric perimeters, often seat themselves on dirt, rust, and other irregularities or obstructions within the fluid line, resulting again in leakage and incomplete or inaccurate testing as well as clean up or environmental hazards.

Thus, there exists a need for a system for the non-destructive testing of the fluid tight integrity of an installed fluid transfer line comprising a removable test baffle and having improved sealing effectiveness between the test baffle and the fluid line, improved means and method for removal of the baffle from the fluid line following completion of the testing, and improved baffle flexibility without reduced strength or pressure resistant capability. There is a further need to provide these objects in a system adapted for the facilitating such testing without danger of permanently fouling or obstructing the drain system.

DISCLOSURE OF THE INVENTION

Accordingly, it is an object of the invention to provide a system for the non-destructive testing of the fluid tight integrity of an installed fluid transfer line, or a portion thereof, the test system comprising a removable test baffle and providing improved sealing effectiveness between the test baffle and the fluid line, improved means and method for removal of the baffle from the fluid line following completion of the testing, and improved baffle flexibility without reduced strength or pressure resistant capability. It is a further object of the invention to provide these objects in system adapted for the facilitating such testing without danger of permanently fouling or obstructing the drain system. That these and other objects of the invention are met by the invention disclosed herein will become evident from the disclosure below.

The invention provides an improved system for the non-destructive testing of the fluid tight integrity of an installed fluid transfer line, such as a drain pipe or vent and waste-water system of a building. A removable test baffle is installed in a seat extending radially into the sidewall of a pipe or other fluid transfer line to isolate an installed portion of the fluid line for testing. The test baffle comprises a pair of gaskets to improve the effectiveness of the baffle in sealing or isolating the line and a domed central web to facilitate testing at increased pressures. The test baffle optionally further includes a lightweight, low cost ribbed construction and a means for removing the baffle from either the convex or concave side of the dome without leaving behind any portion of the baffle to impair fluid flow within the line. On removal, the baffle is flexed into a saddle shape and removed from the line without need for dismantlement of the line.

A preferred embodiment of the invention provides a test system for the non-destructive testing of the fluid-tight integrity of a completely or partially installed fluid transfer line, the system comprising a fluid transfer conduit and a removable test baffle. The conduit has a thickness, an inner surface, and an inner diameter, and further includes a seat extending radially into said thickness from said inner surface. The seat terminates at a seal wall having an inner diameter greater than the inner diameter of the conduit, and is adapted for the reception of the test baffle. The test baffle has a diameter larger than the inner diameter of the conduit and at least as small as the inside diameter of the seal wall but preferably larger than the outside diameter of the seal seat, and comprises a pair of gaskets, a perimeter, and a central web. The first gasket is adapted to sealingly engage the seat in the conduit wall, while the second gasket, located in the perimeter of the baffle, sealingly engages the seal wall. The central web is preferably attached to both the first gasket and the perimeter in a fluid tight engagement, so as to allow isolation of the fluid line for testing. However, depending upon the arrangement of the gaskets and the perimeter, a wide variety of the possible arrangements of which will occur to the reader of this disclosure, different configurations will serve equally as well. The first and second gaskets cooperate, when the test baffle is placed within the conduit with the first gasket in contact with the seat, so that application of a pressure against said test baffle results in an improved seal between both the second gasket and the seal wall, and between the first gasket and the seat, resulting in an extremely effective and efficient seal for isolation of the fluid line. To facilitate removal of the test baffle, which has a diameter larger than the nominal inside diameter of the fluid line, the baffle is typically comprised of flexible material.

The removable baffle is installed within the conduit to cap the fluid line or to isolate a portion of it from the remaining portions. The test or isolation baffle is a substantially circular disc, which may be flat or formed with a convex surface such as a dome, conical, or part spherical configuration, the convex surface preferably being positioned toward the portion of the line to be tested. The baffle preferably comprises a pair of gaskets, sometimes referred to as high- and low-pressure gaskets, to aid in forming a seal within the conduit in which the baffle is positioned. The gaskets are appropriately shaped and dimensioned to allow for a secure, sealed fit with a seat formed in the wall of the conduit's interior surface. The inside surface of the conduit is relieved or machined to form an enlarged diameter seat to receive the baffle, preferably the gasket portion of the baffle. For example, and interior circumferential groove may be formed or cut into an interior wall of a conduit segment to form the seat to receive the baffle. This conduit segment may be and generally is used conveniently as an element in the construction of the fluid line, much as any other pipe or line segment. Alternatively, a seat may be formed by the simple expedient of placing two simple cylindrical sections of conduit end to end, with a baffle sandwiched between them and a sleeve or other member, such as a larger section of conduit of suitable dimension to concentrically engage the conduit sections, encircling the joint to act as a seal wall.

The baffle, with its web and gaskets forms a key component of the invention. The web may be formed separately and attached to the gaskets, or they may be molded or formed as integral or separable parts. The baffle provides a barrier or closure means to isolate the fluid line during installation and testing. The baffle is appropriately shaped and dimensioned to seal the conduit and resist fluid pressures exerted during installation and testing procedures. The baffle is also appropriately shaped and dimensioned to allow no resistance to fluid flow within the fluid line once the baffle and removal means have been removed following testing.

Prior art baffles comprise only a single seal, a gasket around the perimeter of the seal to engage the seat in the conduit wall. Baffles according to the invention comprise a second seal, this seal being disposed around the perimeter of the seal in a position to engage the seal wall which constitutes an outer limit to the conduit seal seat, and thus improved fluid-tight integrity in the seal between the test baffle and the conduit. Preferably, both the first seal and this second gasket seal engage the conduit when the baffle is first installed. As pressure is applied inside the conduit, the second seal is pushed into heavier contact with the seal wall as a result of pressure within the conduit pushing the gasket directly into the seal wall. At the same time, pressure against the central web of the baffle causes the baffle to push harder against the conduit seal seat, further improving the seal between the baffle and the conduit. Thus,the first and second seals or gaskets work together in improving the overall quality of the baffle as a seal between the pressurized portion of the conduit and the outside of the system. In some cases, the first gasket is referred to as a high pressure seal and the second gasket as a low pressure seal because of the tendency of the second gasket to deform more substantially under an initial pressure build-up (when presumably pressures are yet relatively low) and the tendency of the first gasket to take an increasing share of the pressure load as pressure continues to increase. A preferred configuration for the central web of the baffle is a pressure resistant dome, generally of spherical shape. In order to save weight, material, and costs while maintaining the ability of the dome to withstand moderate to high testing pressures, the convex side of the dome optionally comprises a plurality ribs extending radially from the center of the dome, which generally coincides with the center of the web, to the perimeter of the baffle.

In optional embodiments of the invention, the perimeter of the baffle and the seat further comprise, between them, a dependent circumferential skirt and a circumferential channel adapted for releasable interengagement of the skirt, whereby said baffle may be releasably attached to said conduit. Although, preferably, the channel is provided on the conduit and the skirt on the test baffle, as shown in the Figures, due to economies in the manufacture and convenience in the assembly and use of the test system, the skirt and channel may alternatively be located in the reverse sense as well, with only a small penalty in economy and convenience.

Preferred embodiments of the invention further comprise means for removing the baffle from the fitting and the fluid transfer system following testing of the system, without need for dismantling the system. The removal means may comprise a line or cord which is attached to the baffle and operated by pulling to remove the baffle from the conduit. The removal means may extend from the test baffle along the fluid line to an exit, filling, or cleaning port, or to an end of an unfinished segment of the fluid line. Alteratively, a hook or other suitable tool may be used to engage and remove the baffle through an adjacent port.

The removal means preferably further comprises one or more lugs integrally formed with or otherwise attached to the baffle, preferably to the central web. Such lugs are disposed on either the convex or the concave sides of dome-shaped webs, and in particularly preferred embodiments of the invention offering maximum flexibility for installation and testing, are located on both sides. In such embodiments, the removal means comprises a first removal lug disposed upon a concave side of said dome and/or a second removal lug disposed upon a convex side of said dome. The lugs are adapted to be engaged by a removal tool which comprises, for example, a hook adapted to engage an eye in one or both of the lugs, or a removal line attached to one of the lugs, such a removal line comprising a float adapted to hold an end of said line at a surface of a fluid located inside the system, as for example at a cleaning port in a plumbing drain system. It has been found to be particularly advantageous to position such lugs near the perimeter of the baffle. Placing a lug, and particularly a lug located on the convex side of the dome, near the perimeter of the baffle permits relatively easy breaching of the seal once the test is completed, so that any residual pressure may bleed of to the unpressurized side of the seal, thus easing removal of the remainder of the baffle from its seat. Eccentric placement of the lug also facilitates bending of the baffle during removal to ease passage of the baffle through any portions of the conduit between the isolation or test site and the system exit, and reduces the possibility and severity of snags which might occur during removal. Lugs disposed on the concave side of the testbaffle aremost advantageously located atornearthe centerofthe dome, to facilitate collapse and flexing of the dome as it is pulled through the gasket/perimeter portion of the baffle. Preferred embodiments of test baffles comprising lines for removing the baffle from the conduit after testing further comprise optional membranes for retaining the removal means, or the removal line, proximate the baffle web, as for example during shipping, transportation, handling, or installment. Such membranes are removable upon installation to release the removal means for use.

In a further aspect, the invention comprises a second conduit having an end adapted to mate with the end of the first conduit and thereby to trap the test baffle between the seat in the first conduit and the mating end of the second conduit, so that the test baffle is held in place but may be removed as described when desired.

BRIEF DESCRIPTION OF THE DRAWINGS

FIG. 4 is a bottom view of an alternative configuration of a preferred embodiment of the invention.

FIG. 5 is a cutaway view of an alternative configuration of a preferred embodiment of the invention, taken along view 5—5 in FIG. 4.

BEST MODE OF CARRYING OUT THE INVENTION

Figure 1:
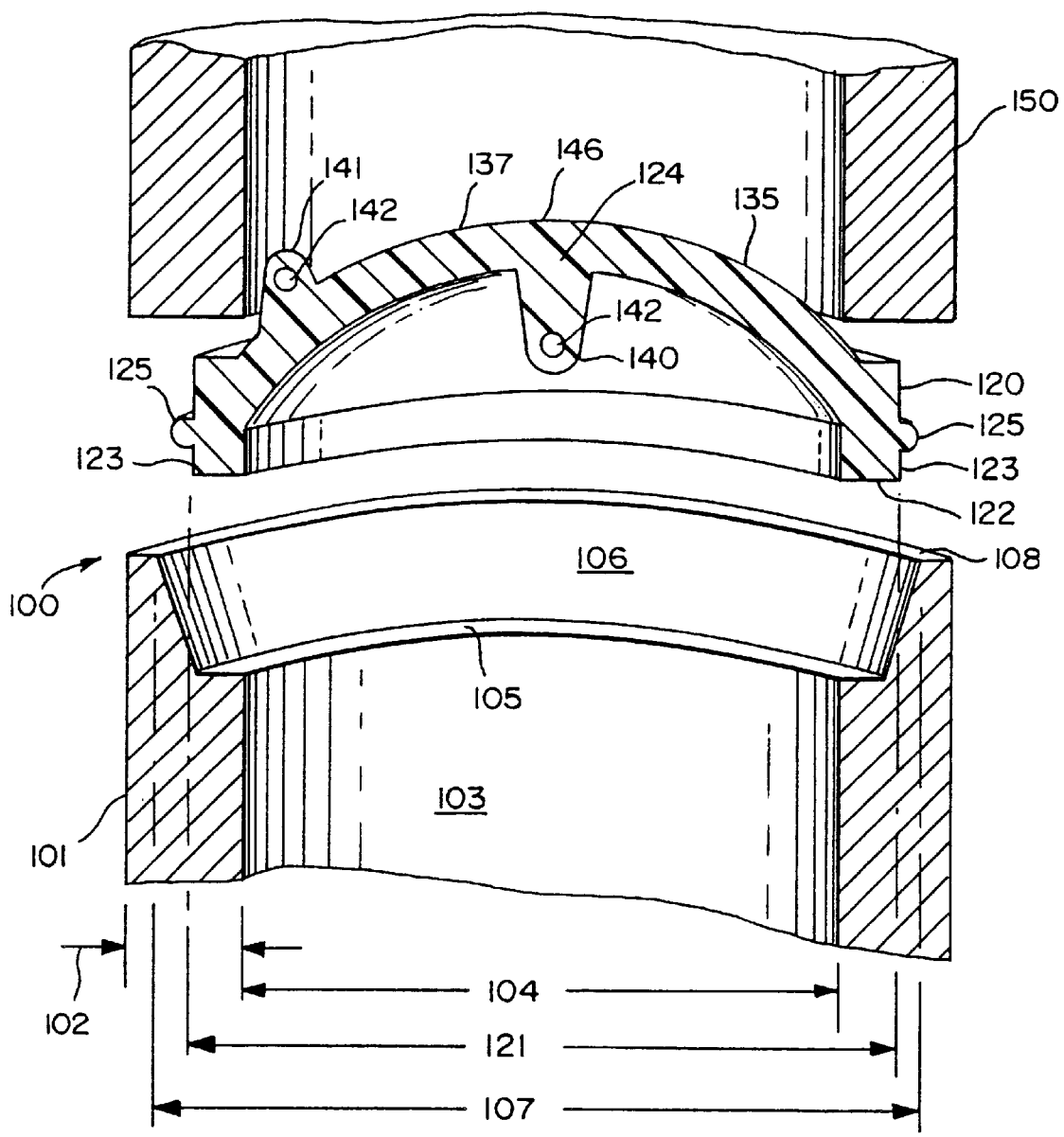
FIG. 1 is a cutaway schematic view of a preferred embodiment of the invention.

For purposes of this disclosure, "fluid" includes any aggregation of matter in which the molecules are able to flow past each other without limit and without the formation of fracture planes, or which is capable of flowing and which changes shape steadily when acted upon by a force tending to change its shape, and includes, without limitation, any liquid or gas.

Turning now to the drawings, the invention will be described in a preferred embodiment by reference to the numerals of the drawing figures wherein like numbers indicate like parts.

FIG. 1 is a cutaway schematic view of a preferred embodiment of the invention. Test system 100 comprises fluid transfer conduit 101 and removable test baffle 120. Conduit 101 has thickness 102, inner surface 103, and inner diameter 104. The conduit further comprises seat 105, which extends radially into the wall of the conduit, that is to say into thickness 102, from inner surface 103, terminates at seal wall 106. Seal wall 106 may be formed from an integral portion of the conduit, as for example by machining or molding seat 105 to extend only partially through thickness 102, or may be formed by a separate piece, such as for example a sleeve or hose fitted in close contact to the outside of the conduit.

Test baffle 120 has diameter 121 which is larger than inner diameter 104 of the conduit but not larger than inside diameter 107 of seal wall 106, and which is equal to the outside diameter of seal seat 105. Test baffle 120 comprises first gasket 122, perimeter 123, and central web 124. First gasket 122 is sized and configured to sealingly engage seat 105 in conduit 101. Perimeter 123 further comprises second gasket 125, which is sized and configured to sealingly engage seal wall 106. It is advantageous in many circumstances to provide seal wall 106 with a non-uniform or "beveled" diameter, as for example the sloping seal wall shown in FIG. 1 which starts at a minimum diameter at the edge of seat 105 and increases to a maximum at end 108 of conduit 101. One advantage of such variable diameter configurations is that in configurations having diameters which constrict along the axis of the tube as one moves toward the seal seat (as shown in FIG. 1) the seal effected by baffle 120, and particularly second gasket 125, increases as pressure is applied to the baffle from the interior of the conduit. Test baffle 120 further comprises central web 124, which is attached in a fluid tight engagement to perimeter 123 to resist pressures applied within the fluid line on distal side 146 of the web. In the embodiment shown in the Figure, test baffle 120 comprises dome 135, which is preferably of spherical or substantially spherical shape in order to improve resistance of the web to pressures applied to convex side 137 of the web. Baffle 120 is preferably flexible to facilitate removal of the baffle either through conduit 101 or through the other side of the fluid line, including second conduit portion 150, which preferably has an inside diameter substantially equal to inner diameter 104 of first conduit portion 101.

Figure 2:
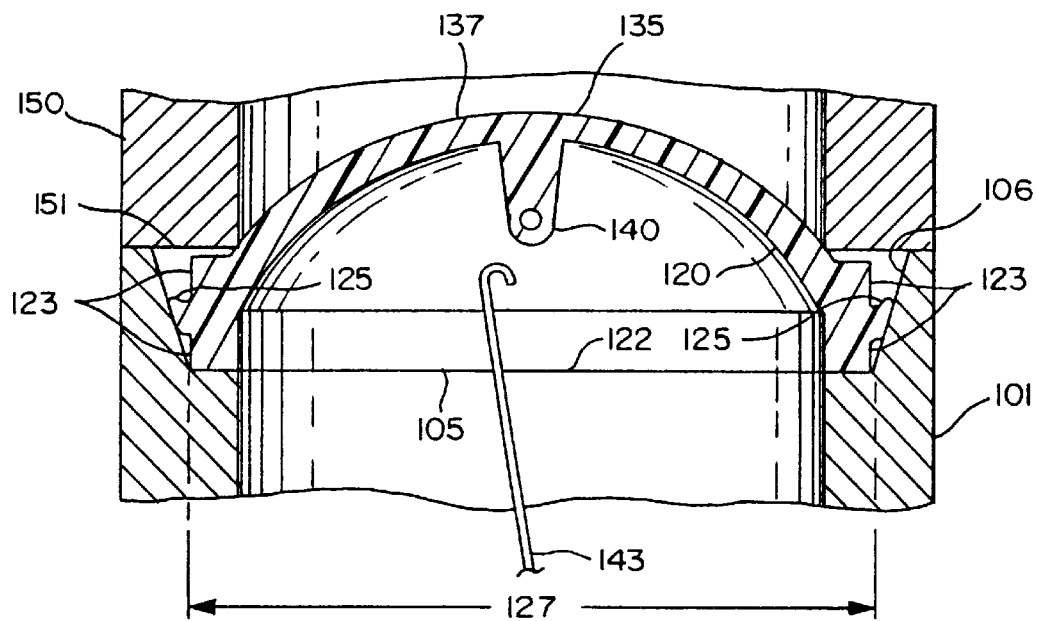
FIG. 2 is a cutaway schematic view of an installed alternative configuration of a preferred embodiment of the invention.

In FIG. 2, the test system is shown in an assembled configuration. Baffle 120 is in place on seat 105 with first gasket 122 in sealing engagement with the seat and with second gasket 125 in sealing contact with seal wall 106. Because the diameter of second gasket 125 is greater than diameter 121 (FIG. 1) of the perimeter baffle, but between outside diameter 107 of seal wall 106 and outside diameter 127 of the seal seat, second gasket 125 is more or less deformed from its nominal shape when the test baffle is in place. The deformation of the second gasket when the baffle is put in place provides an improved, positive seal for completion of testing of the fluid line of which conduit 101 forms a part.

Figure 3:
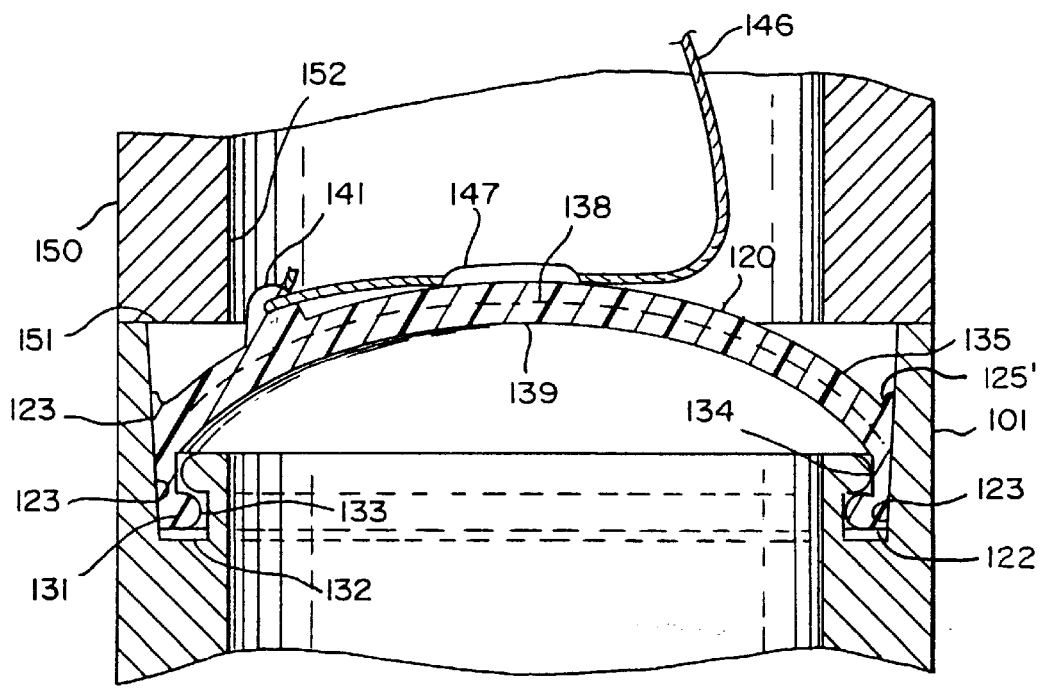
FIG. 3 is a cutaway schematic view of an alternative configuration of a preferred embodiment of the invention.

FIG. 3 is a cutaway schematic view of an alternative configuration of a preferred embodiment of the invention. Baffle 120 comprises dependent skirt 131, which further comprises radially extending rim 133, while conduit 101 comprises channel 132 and radially extending rim 134. Channel 132, skirt 131, and rims 133 and 134 are sized and configured such that they provide means for an elastic, releasable, snap fit of baffle 120 to conduit 101. Due to economies in making and assembling the test system, it is generally preferable that skirt 131 be disposed on baffle 120 and channel 132 in conduit 101, but functionally it is not important whether the skirt or the channel is disposed on the baffle and the remaining component on the conduit, or vice versa.

Another means of keeping baffle 120 in place prior to testing, or at other periods during which the fluid line is not pressurized, is to configure the baffle, as for example in the manner shown in the Figures, such that the entire perimeter of the baffle rides within the recess formed by seat 105 and seal wall 106, so that upon attachment of a second conduit piece 150, which may or may not be specially adapted for the purpose, to first conduit piece 101, baffle 120 is trapped between the two conduit pieces and restricted from movement in either direction along the conduit or fluid line. When dependent skirts and channels are used, as shown in FIG. 3, no further need for holding baffle 120 in place is required. Still, as shown in that Figure, attachment of second conduit piece 150 provides additional means of retaining the baffle.

In FIGS. 4 and 5, an alternative configuration of a preferred embodiment of the invention is depicted. Baffle 120' comprises web 124' and a plurality of integral reinforcing ribs 139 extending from center 138 of the web to baffle perimeter 123. Ribs 139 serve to strengthen dome 135 and increase its ability to withstand pressures within the fluid line, especially pressures applied to convex side 137, by stiffening web 124'. Ribs 139 are preferably molded, formed, or machined integral extensions of web 124' and dome 135. Also shown in FIGS. 4 and 5 is alternative embodiment 125' of the second gasket. As baffle 120' is placed in a seat of a conduit of the type described, extremities 128 engage seal wall 106 (not shown in FIGS. 4 and 5) and resist pressures applied within the fluid line in the manner described.

A preferred means for removing baffle 120 from the fluid line once testing has been completed is to pull it through by means of a lug provided on either the pressurized or unpressurized side of the test baffle. For example, in FIG. 1 lugs 140 and 141 are provided on both the convex and concave side of dome 135. Both lugs are provided with eyes 142 for engagement by a removal means such as a string 146 or other line, as shown in FIG. 3, or by a retrieval hook 143 as shown in FIG. 2. Preferred embodiments of the test baffle are further provided with means for retaining a string 146 attached to a removal lug in a desired position so that the string does not become fouled or trapped in an unwanted location during assembly of the fluid line. A preferred retaining means 147 is shown in FIGS. 3 and 5. Retaining means 147 comprises a pair of raised parallel ridges spaced so as to provide an interfering fit and thus a releasable engagement for string 146. As best shown in FIG. 3, ridges 147 serve to hold removal line 146 in a desired position inside the conduit during testing of the conduit, in order to avoid snags, etc. In embodiments of the invention provided with a pull string and intended for use with liquid-carrying fluid lines such as plumbing drains, a preferred optional addition is a float 148 (FIG. 5) attached to the free end of the string and disposed on installation of the baffle within the conduit at a location easily accessible following completion of the test.

A particularly advantageous disposition of removal lugs provided on test baffle 120 is to proximate the perimeter of the baffle, as close to the edge of the baffle as is possible without causing the lug, other portions of the baffle, or the removal means to foul the side of the conduit during installation, testing, or removal. For example, lug 141 in FIG. 3 is located proximate perimeter 123 of baffle 120, in a position in which neither the lug nor removal means 146 will foul inner surface 152 of conduit member 150 when the baffle is removed. Placing the lug off center is especially advantageous in that it has the effect, when the lug is pulled by a removal means, of concentrating the force applied to the baffle by the removal means to a relatively small section of the baffle, and to the seal provided to the conduit by the baffle, thus easing the breaking of the seal and the release of any residual pressure inside the tested fluid line. In addition, once any residual pressure has been allowed to bleed off through the breach in the seal, the eccentric placement of the lug helps ensure that the baffle will be pulled back and flexed into a saddle shape inside the conduit suitable for easy removal of the baffle, without requiring undue force to pull the baffle through the conduit and with minimal danger of snagging pipe joints, etc.

Figure 6:
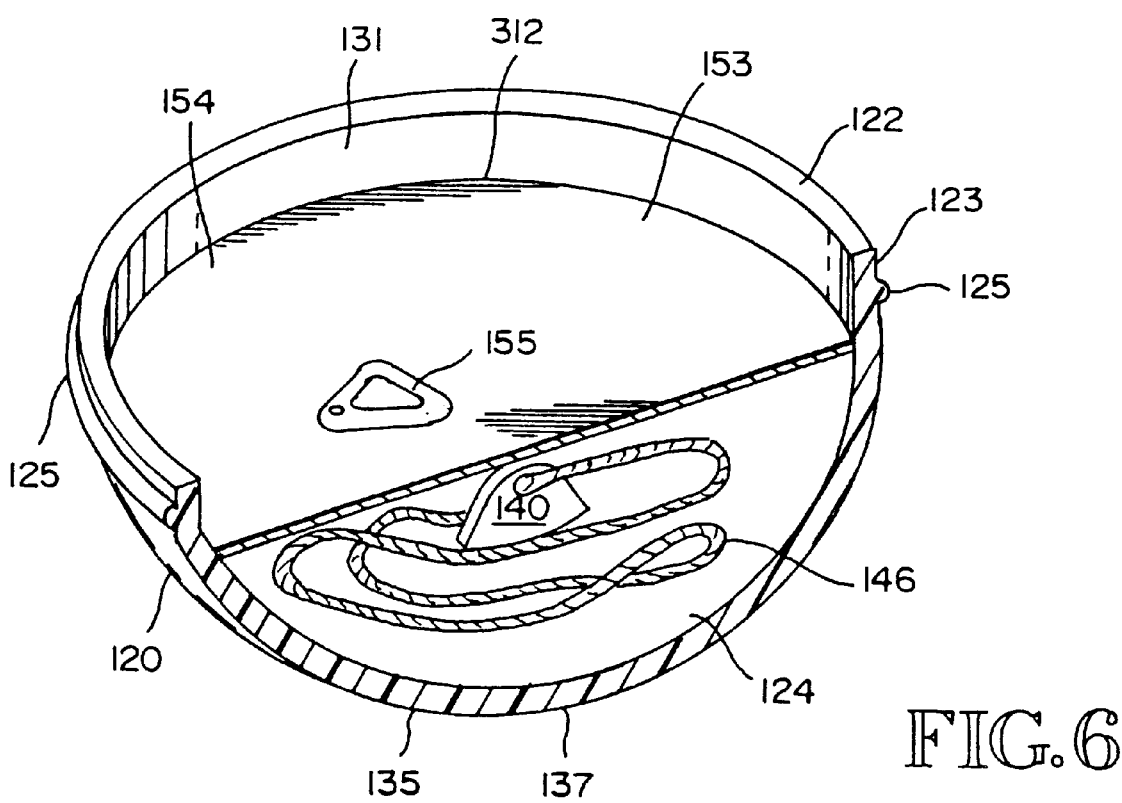
FIG. 6 is a schematic partial cutaway view of a test baffle according to the invention.

An optional retaining or storage means for restraining the removal means is shown in FIG. 6. Test baffle 120 comprises removable storage or retaining means 153, which is shown in the form of a membrane attached to inner circumference 312 of baffle 120, in such manner as to trap line or cord 146 or other removal means within (in the embodiment shown) dome 135. The retaining or storage means facilitates storage, transportation, handling, and installation of the test baffle, without the removal means becoming fouled or otherwise proving troublesome. Once the test baffle has been installed, the storage or retaining means may be removed, as for example by puncturing membrane 154 with a screwdriver or other tool, or by use of an optional removal pull tab 155. Removal is further facilitated by providing a membrane, in embodiments which use membranes, with a score line or other means for making the membrane frangible proximate inner circumference 312 of the baffle. In embodiments in which a membrane is used, the membrane may be solid (as shown) or perforated, or in any other suitable configuration.

The various components of the invention may be made from any material having qualities suitable for meeting the purposes suggested herein. It has been found particularly both economically and functionally advantageous, however, in building plumbing lines intended for draining wastewater, to fabricate conduit sections from injection molded styrene, acrylonitrile butadiene styrene (ABS), polyvinyl chloride (PVC), and other common building plumbing materials. Test baffles are advantageously constructed of suitably strong but flexible materials such as natural or synthetic rubber or other suitable polymer. Where present, optional retaining or storage means for retaining the removal means of the test baffle are made of materials similar to those used for the test baffle, or from cardboard, styrofoam, or any other suitable material.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

INDUSTRIAL APPLICABILITY

The invention finds applicability in the isolation and interconnection of fluid transfer lines such as vent and wastewater systems where pressure testing of portions of the fluid line is required or useful.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A test system for non-destructive testing the fluid-tight integrity of an installed fluid transfer line, the system comprising:
    a fluid transfer conduit having a thickness, an inner surface, and an inner diameter, and further comprising a seat extending radially into said thickness from said inner surface, said seat terminating at a seal wall having an inner diameter greater than said inner diameter of said conduit; and
    a removable test baffle having a diameter larger than the inner diameter of said conduit and not larger than the inside diameter of said seal wall, said test baffle comprising a first gasket, a perimeter, and a central web, said first gasket adapted to sealingly engage said seat, said perimeter comprising a second gasket adapted to sealingly engage said seal wall, and said central web attached to said first gasket in a fluid tight engagement;
    whereby, when said test baffle is disposed within said conduit with said first gasket in contact with said seat, application of a pressure against said test baffle results in an improved seal between said second gasket and said seal wall, and between said first gasket and said seat.

2. The test system of claim 1, wherein the perimeter of said baffle and said seat further comprise a dependent skirt and a circumferential channel adapted for releasable interengagement of said skirt, whereby said baffle may be releasably attached to said conduit.

3. The test system of claim 1, wherein said central web comprises a pressure resistant dome.

4. The test system of claim 3, wherein said dome comprises a plurality of ribs extending radially from a center of said web to said perimeter.

5. The test system of claim 1, wherein said test baffle further comprises means for removal of the baffle from the fitting and the fluid transfer system following testing of said system, without dismantling said system.

6. The test system of claim 5, wherein said means comprises at least one removal lug disposed on said web, said lug adapted to be engaged by a removal tool.

7. The test system of claim 6, wherein said tool comprises a hook and said lug comprises an eye adapted for reception of an end of said hook.

8. The test system of claim 6, wherein said tool comprises a removal line attached to said lug, said removal line comprising a float adapted to hold an end of said line at a surface of a fluid located inside said system.

9. The test system of claim 6, wherein said lug is disposed proximate said perimeter.

10. The test system of claim 1, further comprising a second conduit having an end adapted to mate with an end of said first conduit, and thereby to trap said test baffle between said seat and the mating end of said second conduit, whereby said test baffle is held removably in place.

11. A test baffle for use within a fluid transfer conduit, said baffle comprising
    a removable test baffle having a first gasket, a perimeter, and a central web, said first gasket adapted to sealingly engage a radially-recessed seat in a fluid transfer conduit, said perimeter comprising a second gasket adapted to sealingly engage a seal wall in said fluid transfer conduit, and said central web attached to said first gasket in a fluid tight engagement;
    whereby, when said test baffle is disposed within the conduit with said first gasket in contact with said seat, application of a pressure against said test baffle results in an improved seal between said second gasket and said seal wall, and between said first gasket and said seat.

12. The baffle of claim 11, wherein the perimeter of said baffle and said seat further comprise a dependent skirt and a circumferential channel adapted for releasable interengagement of said skirt, whereby said baffle may be releasably attached to said conduit.

13. The baffle of claim 11, wherein said central web comprises a pressure resistant dome.

14. The baffle of claim 13, wherein said dome comprises a plurality of ribs extending radially from a center of said web to said perimeter.

15. The baffle of claim 11, wherein said test baffle further comprises means for removal of the baffle from the fitting and the fluid transfer system following testing of said system, without dismantling said system.

16. The baffle of claim 15, wherein said means comprises at least one removal lug disposed on said web, said lug adapted to be engaged by a removal tool.

17. The baffle of claim 16, wherein said tool comprises a hook and said lug comprises an eye adapted for reception of an end of said hook.

18. The baffle of claim 16, wherein said tool comprises a removal line attached to said lug.

19. The baffle of claim 18, further comprising a membrane for retaining the removal means proximate the baffle web, the membrane being removable upon installation to release the removal means for use.

20. The baffle of claim 16, wherein said lug is disposed proximate said perimeter.

* * * * *